(12) United States Patent
Dandachli

(10) Patent No.: US 11,643,947 B2
(45) Date of Patent: May 9, 2023

(54) METHODS AND SYSTEMS FOR A TURBO SHIELD

(71) Applicant: Youssef Dandachli, Austin, TX (US)

(72) Inventor: Youssef Dandachli, Austin, TX (US)

(73) Assignee: PTP Turbo Solutions, LLC, Austin, TX (US)

( * ) Notice: Subject to any disclaimer, the term of this patent is extended or adjusted under 35 U.S.C. 154(b) by 49 days.

(21) Appl. No.: 17/473,432

(22) Filed: Sep. 13, 2021

(65) Prior Publication Data

US 2023/0081192 A1     Mar. 16, 2023

(51) Int. Cl.
   *F01D 25/08*     (2006.01)

(52) U.S. Cl.
   CPC .......... *F01D 25/08* (2013.01); *F05D 2220/40* (2013.01)

(58) Field of Classification Search
   CPC .... F01D 25/08; F01N 13/102; F01N 2310/00; F01N 2310/02; F01N 2310/04; F01N 2310/06; F01N 2310/08; F01N 2310/10; F01N 2310/12; F01N 2310/14; F01N 13/14; F02M 35/10157; F02M 35/10268; F02M 35/10334; F02B 77/11
   See application file for complete search history.

(56) References Cited

U.S. PATENT DOCUMENTS

2016/0290212 A1 * 10/2016 Sarsfield ............... F01D 25/243

FOREIGN PATENT DOCUMENTS

| GB | 1220175 | * | 2/1968 | |
| JP | 09151742 | * | 11/1995 | |
| JP | 2010096299 | * | 10/2008 | |
| JP | 5257768 B2 | * | 8/2013 | |
| WO | WO-03054373 A1 | * | 7/2003 | ............ B32B 15/02 |

OTHER PUBLICATIONS

Abstractor JP09151742 (Year: 1997).*
Abstract of JP 2010096299 (Year: 2008).*
English translation of JP5257768 (Year: 2008).*

* cited by examiner

*Primary Examiner* — Woody A Lee, Jr.
*Assistant Examiner* — Brian O Peters
(74) *Attorney, Agent, or Firm* — Pierson Intellectual Property LLC

(57) ABSTRACT

A turbo shield with a slit, wherein the slit is configured to allow an inner diameter across the turbo shield to increase and decrease without altering the properties of fibers associated with the turbo shield.

12 Claims, 3 Drawing Sheets

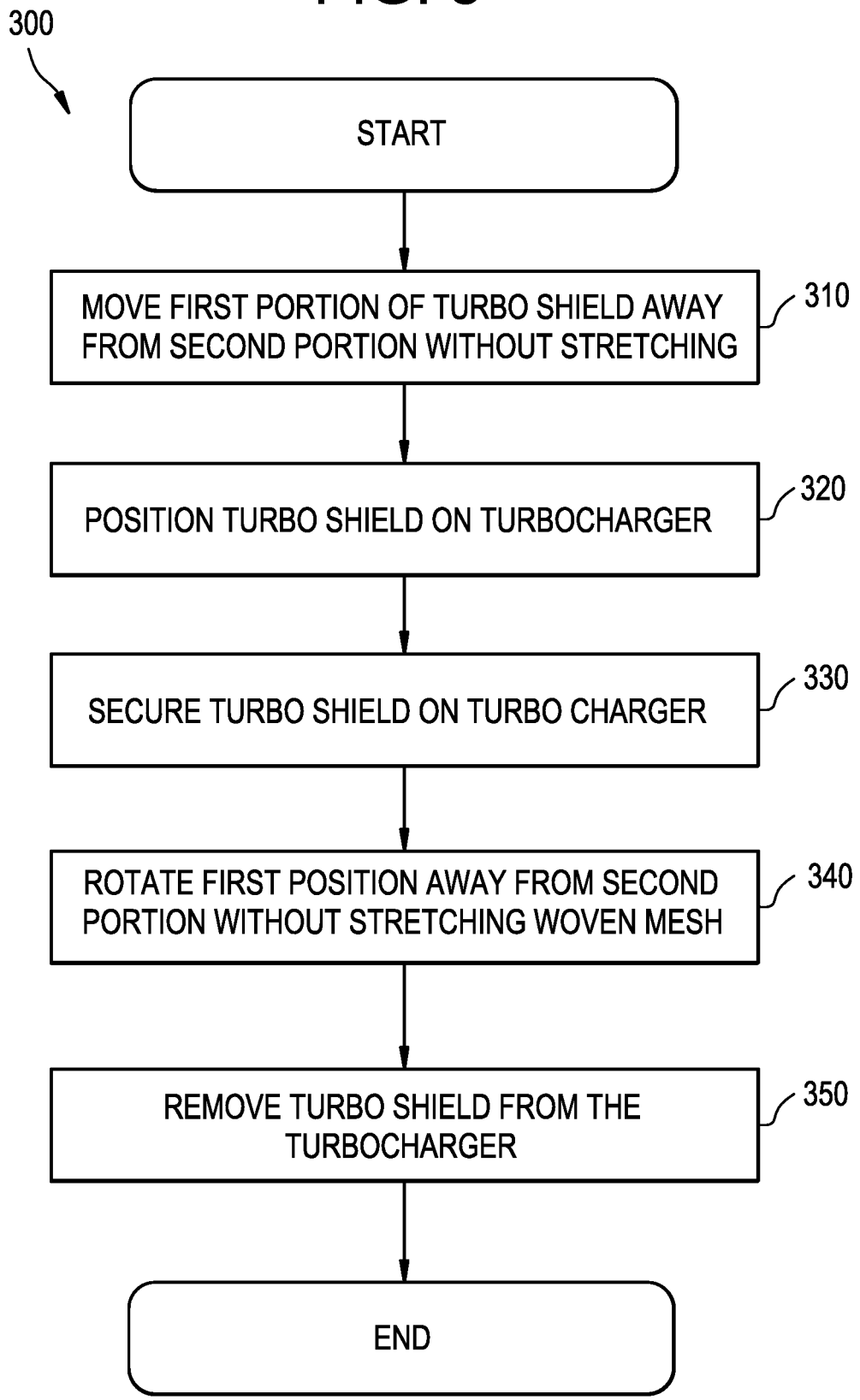

METHODS AND SYSTEMS FOR A TURBO SHIELD

BACKGROUND INFORMATION

Field of the Disclosure

Examples of the present disclosure are related to systems and methods for a turbo shield. Specifically, embodiments are related to a turbo shield with a slit, wherein the slit is configured to allow an inner diameter across the turbo shield to increase and decrease without stretching or altering the properties of a woven mesh associated with the turbo shield.

Background

Heat shields in vehicles are designed to protect electronic packages, sensors, wiring, engines, and other vehicle components from contacting and/or emitting substantial amount of heat. For example, a heat shield may be utilized to cover a turbocharger, exhaust manifold, exhaust piping, engine, catalytic converter, etc., wherein these components may generate a substantial amount of heat.

Turbo shields are configured to elevate the performance of vehicles by providing heat protection and reducing turbo lag to a turbocharger. Conventional turbo shields are form fitted around a turbocharger, and utilize carbon fibers to retain heat inside of the turbo. This causes the exhaust gases inside the turbocharger to become hotter, enabling the turbocharger to spool up more quickly.

However, when positioning conventional turbo shields around the turbo charger, the fibers associated with a woven mesh are stretched. After repeated stretching, the fibers become distorted, which reduces the effectiveness of the turbo shield.

Accordingly, needs exist for more efficient and effective turbo shields that include a slit, wherein the slit is configured to allow the turbo shields to be removed and repositioned on the turbochargers without degrading the carbon fibers associated with the turbo shields.

SUMMARY

Embodiments described herein are directed towards systems and methods for a turbo shield that is configured to be efficiently removed and recoupled to a turbocharger without degrading the fibers associated with the turbo shield. The turbo shield may include a body, mesh weave, insulation, first rivet, second rivet.

The body of the turbo shield may be configured to house and secure the other elements of the turbo shield together. The body may be substantially annular in shape, and have an inner circumference and an outer circumference. The body of the turbo shield may be configured to isolate the heat produced by a turbocharger with the purpose of reducing turbo lag, cooler air intake temperatures, protecting and prolonging vital under hood components, and give a boost in horse power.

The body may include a first portion, second portion, and a slit, wherein the slit separates the first portion from the second portion. The first portion may include a first edge and second edge, and the second portion may include a third edge and a fourth edge. The first portion and the second portion may be configured to be separated from each other at two locations, wherein the first location is between free ends of the first portion and the second portion and the second location is across a hinge aligned with the outer circumference of the body. This may enable the body to be positioned over the turbo charger without stretching the mesh weave. In embodiments, the first edge and the third edge may be free ends configured to be moved away from each other to increase a distance from the first edge and the third edge, wherein there is no piece of material directly connecting the first edge to the third edge.

The slit may be positioned between the second edge and the fourth edge, wherein the slit forms a hinge or axis of rotation aligned with the outer circumference of the body. The slit may extend from the inner circumference of the body towards the outer circumference of the body to form the hinge positioned on the outer circumference of the body. The hinge may enable the second edge and the fourth edge to be rotated away from each other. In embodiments, when the body is positioned on a turbo charger the second edge and the fourth edge may be positioned adjacent to each other, and when it is desired to remove the turbo shield from the turbocharger the angle between the third edge and the fourth edge may be greater than one hundred eighty degrees. In embodiments, a length of the slit may be slightly less than a distance between the outer circumferences of the body to the inner circumference of the body, and be greater than a thickness of the insulation layer.

The mesh weave may be formed of any material that can be woven into a tight mesh weave. For example, the mesh weave may form an outer layer of the body and be formed of pulverized volcanic lava rock (Rated 1800° F. Direct Heat/2500° F. Radiant Heat). In embodiments, the mesh weave may be any material that stretching causes the material to break down, which reduces their heat retention capabilities. For example, the mesh weave may be a stainless steel mesh. In embodiments, the mesh weave may be positioned on an outer layer of the base.

The insulation may be an insulated wool, such as calcium magnesium silicate wool. The insulation may be configured to retain the heat produced by the turbocharger within the turbo shield.

The first rivet may be a projection positioned on the first portion of the body proximate to the first edge. The second rivet may be a projection positioned on the second portion of the body proximate to the third edge. In use, a coupling mechanism, such as a spring or clamp, may utilize the first rivet and the second rivet to secure the body around a turbocharger. This may create a linear force across the body on an opposite side of the body as the slit, wherein the linear force extends in a first axis that is perpendicular to a second axis associated with a length of the slit.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 3 depicts a method of using a turbo shield, according to an embodiment.

Figure 1:
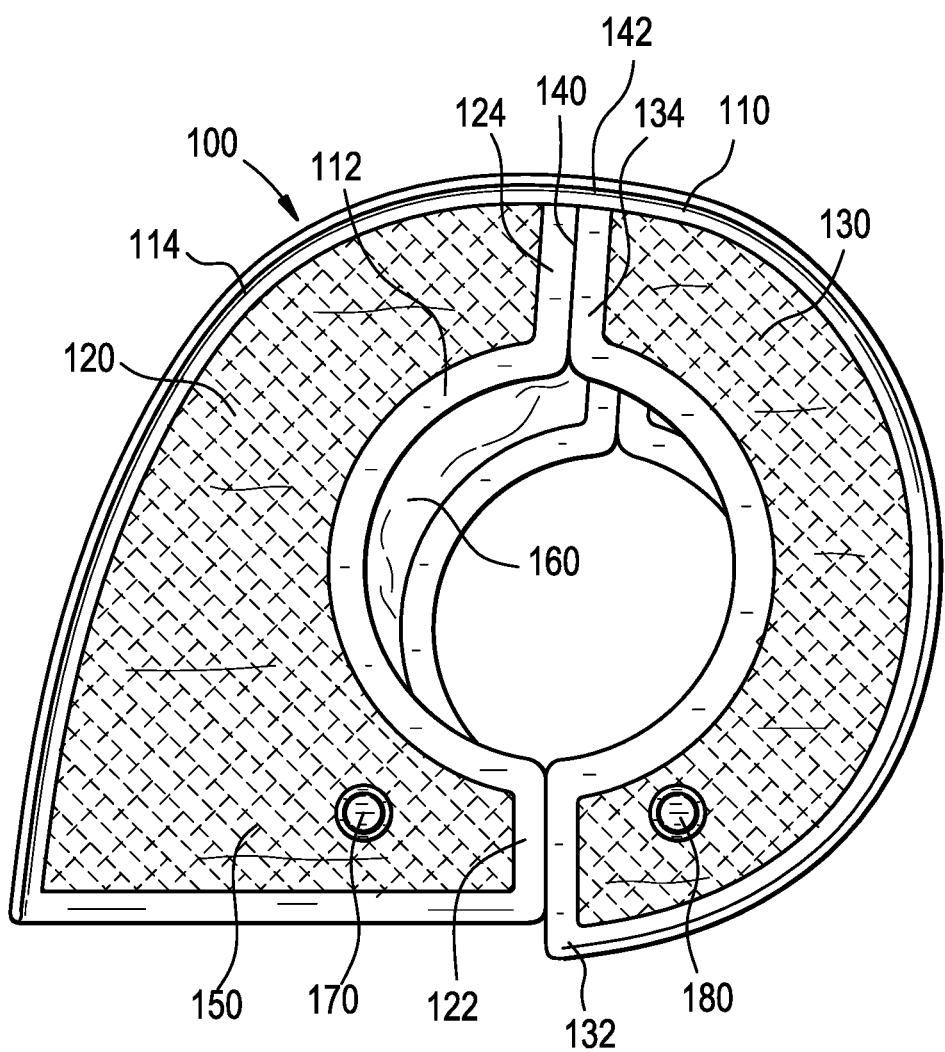
FIG. 1 depicts a turbo shield, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Embodiments described herein are directed towards systems and methods for a heat shield configured to be removeably coupled to a turbocharger without degrading the mesh weave associated with the turbo shield.

Turning now to FIG. 1, FIG. 1 depicts one embodiment of a turbo shield 100. Turbo shield 100 may include a body 110, mesh weave 150, insulation 160, first rivet 170, and second rivet 180.

Body 110 of turbo shield 100 may be configured to house and secure the other elements of the turbo shield 100 together. Body 110 may have an annular shape, with an inner circumference 112 and an outer circumference 114. In embodiments, the inner circumference 112 and outer circumference 114 may dynamically change in shape and size to change the overall contour and outline of body 110. This may enable inner circumference 112 and outer circumference 114 to increase in size to be positioned around a turbo charger without stretching mesh weave, and then to subsequently decrease in size to secure body 110 to a turbo charger. Body 110 may include a first portion 120 with first edge 122 and second edge 124, and second portion 130 with third edge 132 and fourth edge 134. First portion 120 and second portion 130 may be configured to be separated at two different locations.

A first location of separation may be between first edge 122 and third edge 132, wherein first edge 122 and third edge 132 are free ends that are not coupled together. When first edge 122 and third edge 132 are pulled apart there may be an open space extending across multiple different planes. Through the opening created between first edge 122 and third edge 132 a turbocharger may be positioned within the inner circumference 112 of body 110.

The second location of separation between first portion 120 and second portion 130 may be at slit 140. Slit 140 may be positioned between the second edge 124 and the fourth edge 134, wherein second edge 124 and fourth edge 132 are not free ends. Slit 140 may extend from inner circumference 112 towards the outer circumference 114 to form a hinge 142 positioned on the outer circumference 114. In embodiments, an axis of rotation created by hinge 142 may extend from a front face of body 110 to a rear face of body 110. The hinge 142 formed by the slit 140 may enable the second edge 124 and the fourth edge 134 to be rotated away from each other while the outer ends of second edge 124 and fourth edge 134 remain in close contact and a distance between the inner ends of second edge 124 and fourth edge 134 increases. In embodiments due to hinge 142 there will be constant contact between first portion 110 and second portion 120, which is unlike the complete opening formed across the first location.

In embodiments, when body 110 is positioned on a turbo charger the second edge 124 and the fourth edge 134 may be positioned adjacent to each other, and when it is desired to remove the turbo shield 100 from the turbocharger the angle between the second edge 124 and fourth edge 134 may gradually increase to be greater than one hundred eighty degrees. This may enable an outer surface of second portion 120 to be rotated and positioned adjacent to an outer surface first portion 130, without stretching mesh weave 130. In embodiments, a length of the slit 140 may be slightly less than a distance between the outer circumferences 114 to the inner circumference 112, and be greater than a thickness of the insulation layer 160. Furthermore, when the body is positioned over a turbo charger, second edge 124 and fourth edge 134 may be overlaid on top of each other, or may be positioned directly adjacent to each other across slit 140.

Mesh weave 150 may be formed of any material that can be woven into a tight mesh weave, and form an outer surface of body 110. Mesh weave 150 may be positioned on a front face, rear face, and curved surface of body 110—extending from first edge 112 to third edge 132. Mesh weave 150 may be formed of pulverized volcanic lava rock (Rated 1800° F. Direct Heat/2500° F. Radiant Heat). In embodiments, the mesh weave 150 may be any material that is negatively impacted by stretching, wherein the stretching causes the material associated with mesh weave 150 to break down and reduces the heat retention capabilities of the material. For example, the mesh weave 150 may be a stainless steel mesh.

The insulation layer 160 may be insulated wool, such as calcium magnesium silicate wool. The insulation layer 160 may be configured to retain the heat produced by the turbocharger within the turbo shield 100. In embodiments, the insulation layer 160 may be positioned on an internal surface of body 110, and the stretching of the insulation may or may not impact the insulation properties of the insulation layer 170. As such, insulation layer 160 may be formed of a much more pliable material than the mesh weave 150.

The first rivet 170 may be a projection positioned on the first portion 120 of the body 110 proximate to the first edge 122. The second rivet 180 may be a projection positioned on the second portion 130 proximate to the third edge 132. In use, a coupling mechanism, such as a spring or clamp, may utilize the first rivet 170 and the second rivet 180 to secure the body 110 around a turbocharger. The external coupling mechanism may create a linear force across the body 110 on an opposite side of the body as the slit, wherein the linear force extends in a first axis that is perpendicular to a second axis associated with a length of the slit 140.

Figure 2:
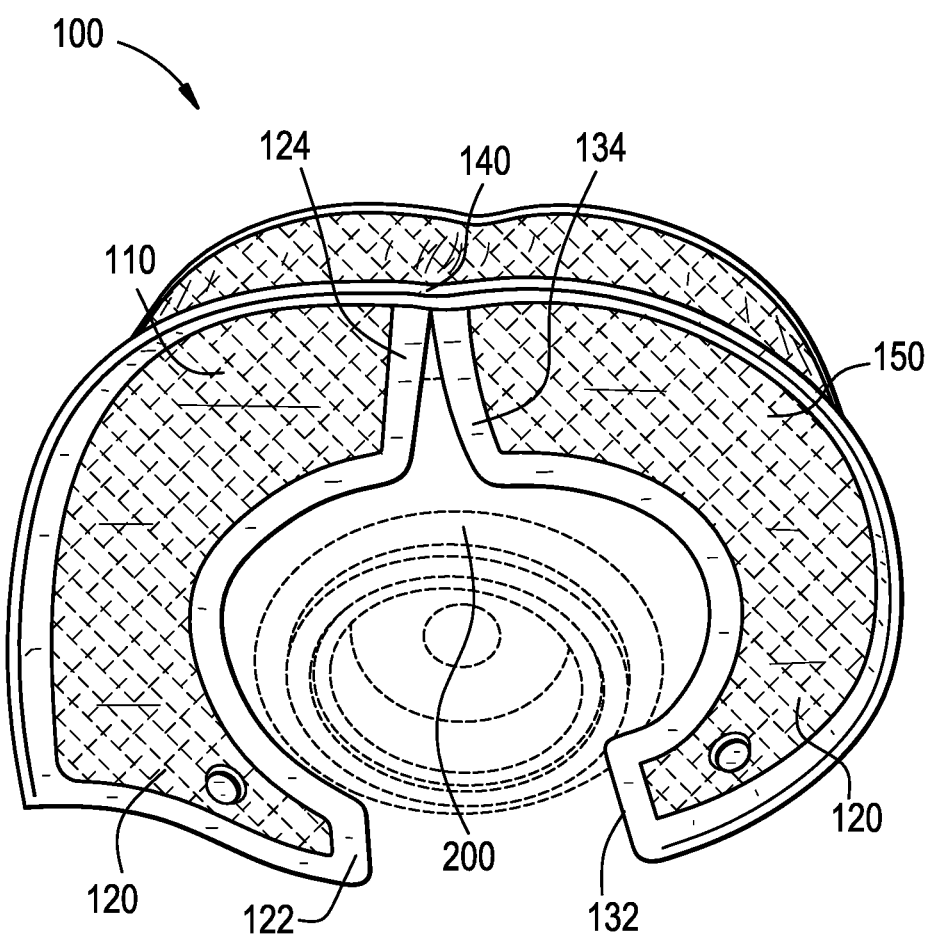
FIG. 2 depicts a turbo shield positioned on a turbocharger, according to an embodiment.

FIG. 2 depicts turbo shield 110, according to an embodiment. Elements depicted in FIG. 2 may be described above, and for the sake of brevity a further description of these elements may be omitted.

As depicted in FIG. 2, the bottom opening of turbo shield 100 may be stretching apart such that first edge 122 and third edge 132 are positioned away from each other to accommodate a turbocharger. The bottom opening may be increased to a substantial length due to slit 140 allowing second edge 124 and fourth edge 134 to be positioned away from each other. As shown in FIG. 2, the location of slit 140 may be aligned in a plane to be within the opening created between first edge 122 and third edge 132. This may allow a length of the bottom opening to be maximized without stretching mesh weave 150.

FIG. 3 depicts a method for removable coupling a turbo shield from a turbocharger, according to an embodiment. The operations of the method presented below are intended to be illustrative. In some embodiments, the method may be accomplished with one or more additional operations not described, and/or without one or more of the operations discussed. Additionally, the order in which the operations of the method are illustrated in FIGURES and described below is not intended to be limiting.

At operation 310, a first portion of a turbo shield may be rotated away from a second portion of the turbo shield. An axis of rotation may be formed via a slit extending from an inner circumference of the body towards the outer circumference of the body of the turbo shield. Specifically, inner edges of the first portion and the second portion of the turbo shield may be rotated around the axis of rotation to create a space between the inner edges, wherein the angle associate with the hinge may be greater than ninety degrees. This may allow a bottom opening to be formed between external edges of the first portion and the second portion that not directly coupled together. In embodiments, when the first portion and the second portion are rotated away from each other, a mesh weave on the external surface of the first portion and the second portion may not be stretched.

At operation 320, the turbo shield may be positioned around turbocharger by sliding an open bottom end between external edge of the first portion around the turbocharger.

At operation 330, a coupling mechanism may be positioned on projections on the first portion and the second portion. This may cause a distance between the inner edges to be minimizes, and an angle associated with the hinge may be close to zero.

At operation 340, the coupling mechanism may be removed, the first portion may be rotated away from the second portion, and the angle associated with the hinge may be greater than ninety degrees.

At operation 350, the turbo shield may be removed from the turbocharger without stretching the mesh weave on the external surface of the turbocharger.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. It will also be noted that each block of the block diagrams and/or flowchart illustrations, and combinations of blocks in the block diagrams and/or flowchart illustrations, may be implemented in different orderings, combinations, etc., with additional blocks and/or blocks removed.

What is claimed is:

1. A turbo shield comprising:
   a first layer;
   a second layer;
   an inner circumference;
   an outer circumference;
   a slit extending from the inner circumference towards the outer circumference, wherein the slit forms a hinge at the outer circumference, the slit dividing a first portion and a second portion of the turbo shield, the first portion is configured to be rotated away from the second portion on an axis at the hinge,
   the first portion having a first edge at a free end and a second edge adjacent the hinge,
   the second portion having a third edge at a free end and a fourth edge adjacent the hinge, and
   wherein a first location of separation is formed between the first edge and third edge, and the slit forms a second location of separation between the second edge and the fourth edge.

2. The turbo shield of claim 1, wherein the first edge and third edge are configured to be positioned adjacent to each other on opposite sides of the slit when the turbo shield is positioned on a turbocharger, wherein the axis is positioned along the outer circumference.

3. The turbo shield of claim 2, wherein the first edge and third edge are configured to be positioned away from each other to remove the turbo shield from the turbocharger.

4. The turbo shield of claim 3, further comprising: a first projection positioned on the first portion;
   a second projection positioned on the second portion, wherein the first projection and the second projection are configured to receive forces from a coupling mechanism in a first plane, wherein the first plane in orthogonal to a longitudinal axis of the slit.

5. The turbo shield of claim 2, wherein a length of the slit is less than a distance from the inner circumference to the outer circumference.

6. The turbo shield of claim 5, wherein the length of the slit is greater than a thickness of the first layer, wherein the second layer is an outer surface of the first portion and the second portion.

7. The turbo shield of claim 1, wherein the axis is aligned with an opening between the first portion and the second portion.

8. The turbo shield of claim 7, further comprising: wherein a distance across the opening is based on an angle between the first portion and the second portion.

9. The turbo shield of claim 1, wherein the first layer is a formed of an insulating material.

10. The turbo shield of claim 1, wherein the second layer is formed of a woven mesh.

11. The turbo shield of claim 10, wherein the woven mesh is not stretched when rotating the first portion away from the second portion.

12. The turbo shield of claim 10, wherein the woven mesh is stainless steel.

\* \* \* \* \*